(12) United States Patent
Braun et al.

(10) Patent No.: US 6,218,741 B1
(45) Date of Patent: Apr. 17, 2001

(54) DEVICE FOR CONTROLLING AUTOMATIC OPERATION OF A WINDSHIELD WIPER WITH IMPROVED CONTROL MEANS FOR SETTING RAIN SENSOR SENSITIVITY

(75) Inventors: Peter Braun, Buehlertal; Hans Meier, Ottersweier; Henry Blitzke, Buehl, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/308,581
(22) PCT Filed: Aug. 4, 1998
(86) PCT No.: PCT/DE98/02229
  § 371 Date: May 21, 1999
  § 102(e) Date: May 21, 1999
(87) PCT Pub. No.: WO99/16647
  PCT Pub. Date: Apr. 8, 1999

(30) Foreign Application Priority Data
Sep. 26, 1997 (DE) ............................................. 197 42 657

(51) Int. Cl.[7] ................................................... B60S 1/08
(52) U.S. Cl. .................................. 307/10.1; 15/DIG. 15; 318/483; 318/DIG. 2; 340/602; 340/604
(58) Field of Search ........................... 307/10.1; 318/443, 318/444, DIG. 2, 483; 15/DIG. 15, 250.001; 340/602, 604

(56) References Cited

U.S. PATENT DOCUMENTS

| | | | |
|---|---|---|---|
| 4,859,867 | * | 8/1989 | Larson et al. .................... 318/DIG. 2 |
| 5,729,105 | * | 3/1998 | Droge .................................. 318/483 |
| 5,780,719 | * | 7/1998 | VanDam ............................. 318/483 |
| 6,057,660 | * | 5/2000 | Meier et al. .................... 318/DIG. 2 |
| 6,084,519 | * | 7/2000 | Coulling et al. ..................... 340/602 |

* cited by examiner

Primary Examiner—Albert W. Paladini
(74) Attorney, Agent, or Firm—Michael J. Striker

(57) ABSTRACT

The device for controlling automatic operation of a windshield wiper in a motor vehicle includes a central electronic control unit provided with means for triggering wiping operations of the windshield wiper; a rain sensor including a detector for rain on the windshield and a device for generating sensor signals for the triggering of individual wiping operations according to detector response, which is connected to the control unit in order to furnish the sensor signals to the control unit, and a sensitivity control device for adjusting rain sensor sensitivity, which includes a display device for observing the rain sensor sensitivity or parameters controlling it optically and buttons operable to adjust the rain sensor sensitivity or at least one of the parameters controlling it.

13 Claims, 1 Drawing Sheet

DEVICE FOR CONTROLLING AUTOMATIC OPERATION OF A WINDSHIELD WIPER WITH IMPROVED CONTROL MEANS FOR SETTING RAIN SENSOR SENSITIVITY

BACKGROUND OF THE INVENTION

Field of the Invention

The present invention relates to devices for controlling automatic operation of a windshield wiper in a motor vehicle and, more particularly, to devices for controlling automatic operation of a windshield wiper with improved control means for adjusting rain sensor sensitivity.

A wiper device with a rain sensor is known on the market. It controls the wiping frequency of a motor vehicle windshield wiper as a function of the rain intensity or the wetting of a front window. This involves for instance optical rain sensors, which couple infrared or visual light from a transmitter into the window at one point, conducted along a measurement path within the window, and at a further point couple it back out of the window again at a receiver. The intensity of the light received by the receiver is dependent on the degree of wetting of the window in the region of the measurement path and is delivered as a sensor signal to an evaluator.

In addition, via a lever on the steering column, the vehicle driver manually turns on the automatic wiping function of the wiper device.

In addition, once again manually, the driver can set the sensitivity of the rain sensor via a knurled wheel on the lever on the steering column.

A disadvantage of this is that setting the sensitivity of the rain sensor via a resistance-encoded switch on the lever on the steering column entails increased effort and expense, because a potentiometer, a tap-changing circuit or a resistance circuit are additionally disposed in the lever on the steering column.

SUMMARY OF THE INVENTION

It is an object of the present invention to provide an improved windshield wiper control device of the above-described type which does not have the above-described disadvantage, i.e. in which a separate rain sensor sensitivity adjusting device is not required on the steering column of the motor vehicle having the rain sensor.

According to the invention the device for controlling automatic operation of a windshield wiper in a motor vehicle includes a central electronic control unit including means for triggering wiping operations of the windshield wiper;

a rain sensor including means for detecting rain on the windshield and means for generating sensor signals for the triggering of individual wiping operations of the wiper, which is connected to the control unit in order to furnish the sensor signals to the control unit; and sensitivity control means for adjusting rain sensor sensitivity of the rain sensor, which includes at least one display for observing the rain sensor sensitivity or parameters controlling the rain sensor sensitivity optically and buttons operable to adjust the sensitivity or at least one of the parameters controlling it.

The wiper control device of the invention has the advantage that the rain sensor sensitivity is set manually by operation of a display device with buttons that may be already present in the motor vehicle, e.g. a radio, in which the rain sensor device is provided.

Various preferred embodiments are described in more detail hereinbelow.

It is particularly preferred when the display device and buttons of a radio connected to a data bus of the motor vehicle are used to set or adjust the rain sensor sensitivity. This dual use of the radio makes it possible to dispense with a separate display or control device for the rain sensor.

Another advantage is that a multifunction display with its own buttons is used.

Another advantage is obtained because the radio and the multifunction display can additionally be used to trigger other control units in the motor vehicle, such as child locks for the rear doors, shifting points for the automatic transmission, memorized seat adjustments for different drivers, programming turn-on and turn-off times, and the temperature of an additional heater. Via a particular combination of buttons, an operating mode can be selected and data or functions of an individual control unit can be varied.

It is also advantageous that switching the radio to a programming mode and the triggering of the control units that occurs in this programming mode are done by actuating only two buttons. These buttons are preferably spaced apart from one another, so that unintentional programming will not be done. This assures a user-friendly design of the radio and thus easier control.

To evaluate the sensor signal, a signal processing stage or amplifier stage for processing and amplifying the sensor signal, and an evaluation circuit for evaluating the sensor signal with a view to triggering the windshield wipers, are typically present. Another advantage of the wiper device of the invention is that the sensitivity of the rain sensor is effected by varying the gain of the sensor signal in the signal processing stage or amplifier stage. However, it is also advantageous to set the sensitivity by varying a threshold, stored in memory in the evaluation circuit; if the sensor signal falls below the threshold or exceeds it, wiping operation is either tripped or turned off.

BRIEF DESCRIPTION OF THE DRAWING

One exemplary embodiment of the invention is shown in the drawing and described in further detail in the ensuing description.

DESCRIPTION OF THE EXEMPLARY EMBODIMENT

Figure 1:
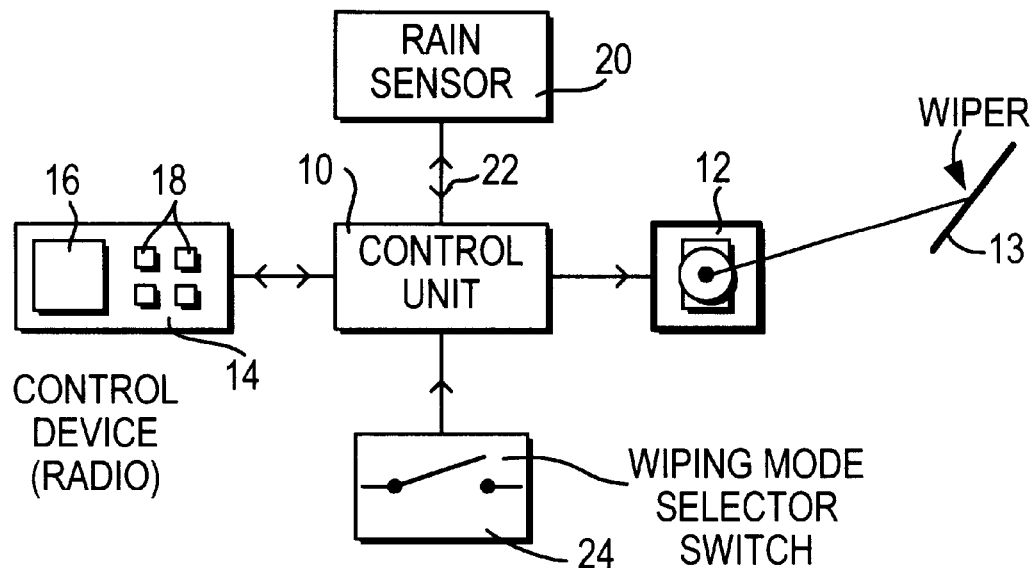
FIG. 1 shows a block circuit diagram of the wiper device with a rain sensor.

FIG. 1 shows a central electronic unit 10 of a data network, laid out in a star pattern, in a motor vehicle. The central electronic unit 10 triggers a wiper motor 12, which in turn drives a windshield wiper 13, shown in sketched fashion. A rain sensor 20 furnishes sensor signals 22 to the central electronic unit 10 for automatic triggering of the windshield wiper 13.

The triggering of the windshield wiper 13 in an intermittent, continuous or automatic wiping mode is selected by the vehicle driver via the actuation of the switch element 24, such as a switch on the steering column, or a button.

Via a control element 14, such as a car radio with a display 16 and buttons 18, the drive can input or change specifications or parameters for the wiping operation such as parameters for automatic wiper triggering as a function of sensor signals 22 of the rain sensor 20.

Figure 2:
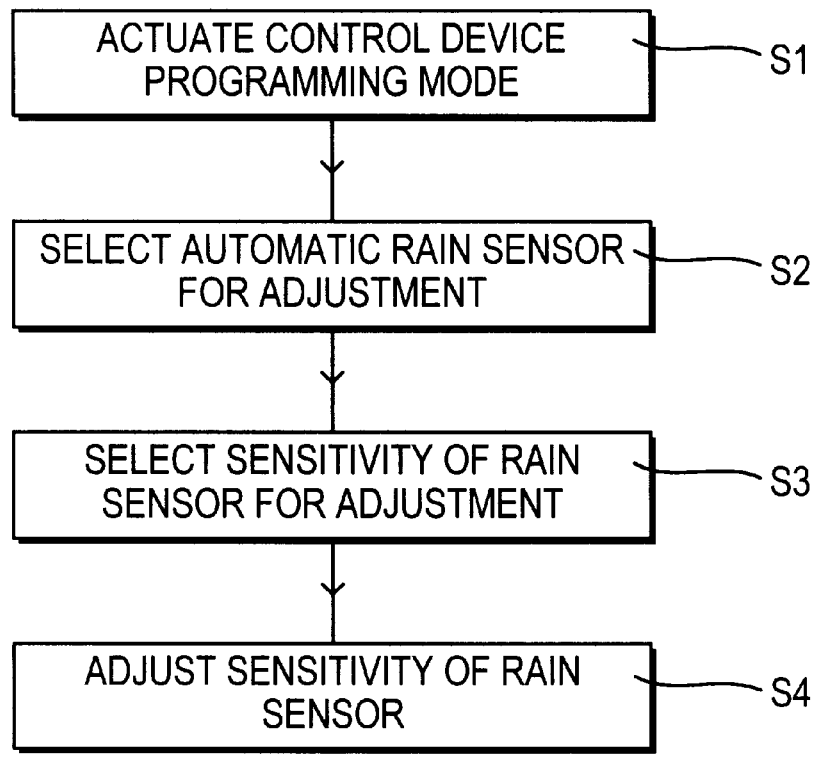
FIG. 2 is a flow chart for setting the sensitivity of the rain sensor using a car radio.

FIG. 2 shows a flowchart for setting the sensitivity of the rain sensor using the car radio 14. Steps S1–S4 describe the sequence performed by the driver to set the sensitivity or also to set other parameters and specifications.

The wiper device of the invention as shown in FIG. 1 functions as follows:

The rain sensor 20 is typically disposed on a windshield of the motor vehicle, in the wiping field of the windshield wiper 13. It essentially detects the wetting of the window with water, and as a function thereof it outputs sensor signals 22 to the central electronic control unit 10. If an automatic wiping mode is selected at the switch element 24, the wiper motor 12 is triggered by the central electronic control unit 10 in such a way that the wiping operation of the windshield wiper 13 is optimally adapted to the intensity of precipitation on the window. To that end, the rain sensor 20 and central electronic control unit 10 are connected via a bidirectional data line of a motor vehicle data bus; when the automatic wiping mode is turned on, the central electronic unit 10 activates the rain sensor 20 and supplies it with parameters set by the driver, and the rain sensor 20 outputs the sensor signals 22 for triggering the wiper motor 12 to the central electronic control unit 10.

The evaluation of the sensor signal 22 for triggering 30 the wiper motor 12 is done in the rain sensor 20 by a microcontroller. To that end, several parameters that have an influence on the sensitivity of the rain sensor 20 are stored in memory in the microcontroller. One of these parameters is the gain for amplifying the sensor signal 22, so that the sensor signal 22 will be between the limits of a predetermined working range. Any change in the gain has a direct effect on the response sensitivity of the rain sensor 20 or the resolution of the sensor signal 22 and thus on the triggering of one or more windshield wipers 13.

Other parameters are the thresholds stored in the microcontroller at which when they are attained by the sensor signal 22 a wiping operation is tripped or turned off. Various turn-on and turn-off thresholds are known for this purpose, such as the thresholds for continuous wiping operation at a slow or fast speed level or for intermittent wiping operation, or the turn-on threshold for the individual tripping of a single wiping cycle.

These thresholds are also dependent on ambient light conditions. For instance, the sensitivity dependent on the turn-on threshold for arbitrary wiping operation is typically set higher at nighttime than in the daytime, because individual droplets of rain on the window at night restrict the driver's vision more sharply, and he is blinded more by oncoming traffic. The nighttime thresholds, which differ from the daytime thresholds, therefore lead to faster tripping of a wiping operation.

There is also a switching threshold for switching back and forth between the daytime and nighttime thresholds; that is, either the daytime or the nighttime threshold is used, depending on the detected ambient light quantity.

The driver can vary these parameters now by making inputs for operating the rain sensor 20 by way of the radio 14 with its display 16 and buttons 18. Via the radio 14, he accordingly programs the microcontroller of the rain sensor 20. For the aforementioned parameters, regions in the microcontroller are specified in which the driver can vary the parameters in accordance with his own wishes, within the applicable valid limits.

It is understood that the driver can also be given the option of varying parameters for intermittent or continuous wiper operation via the radio 14. For example, he can specify the speed of the individual speed levels or adjust the wiper speed in infinitely graduated fashion or set the basic interval in intermittent operation in accordance with his own preferences.

On the basis of the actuation of the buttons in a particular combination, the driver will move from radio operation to the programming mode. If a user-friendly display 16 is employed, the functions of the buttons 18, which in that case each have at least a dual task, are identified differently by means of light emitting diodes (LEDs) and are therefore readily recognized by the driver. This makes the radio 14, 16, 18 user-friendly.

From the display 16, the driver can read off the parameters to be set, and from a numeric or graphic display, such as bar graphs, he can tell the current value of the parameter, which he can vary via suitable buttons 18. These influence for instance buttons 18 for adjusting the radio volume (+/−) or for setting stations at selected radio frequencies.

On the basis of FIG. 2, a method for programming via the radio 14 in four steps S1–S4 will be described; it is distinguished by the fact that with only two buttons 18 on the radio 14, at no additional effort or expense, an arbitrary number of further parameters of the rain sensor (20) or further apparatuses can be programmed. However, this method is merely an example and other known methods can also be employed.

As the first button 18, preferably toggle switches are used, such as a station scanner or volume controller, since with toggle switches more than two states (on/off) can easily be set. As the second button 18, a pushbutton is also needed, such as a band selector button for choosing the frequency band, or a traffic radio button for setting the traffic radio announcements.

In the first step S1, the radio 14 is switched to the programming mode by actuating both the first and second buttons 18 simultaneously on turning on the radio 14, but these buttons are not disposed directly side by side in order to prevent an unintended switchover to the programming mode. For instance, the driver actuates the traffic radio pushbutton and the station scanner toggle switch. The radio 14 is thus converted directly to the programming mode, which is indicated by the alphanumeric display 16 (RDS).

In the second step S2, the driver actuates the toggle switch and thus each time he presses it successively calls up the units to be programmed. He consequently actuates the toggle switch as many times as needed until the display 16 shows "rain sensor", for instance, and he confirms his choice with the pushbutton.

In the third step S3, as in step S2, the functions that can be set by the driver are called up successively. For instance, if after the toggle switch has been pressed once or multiple times, "sensitivity" shows up on the display 16, then the driver confirms this with the pushbutton. The display 16 thereupon shows the current setting for the sensitivity in either graphic or numerical form.

In step S4, the driver changes this setting as he wishes, within the limits specified by the automobile manufacturer, using the toggle switch, and again confirms this with the pushbutton. This (final) confirmation automatically switches the radio 14 out of the programming mode to the radio mode, for instance, and carries the driver inputs to the microcontroller of the rain sensor (20) via the data bus.

If in the programming mode, no input by the driver has been made for a given period of time, such as 20 seconds, then the programming mode is discontinued and the radio mode is initiated.

In a modification of the exemplary embodiment, a multifunction display 16 with its own buttons 18 is used. By way of this display, it is for instance possible for the driver to trigger other apparatuses, such as seat adjustment. Vehicle-relevant or road-relevant data can also be indicated to the driver via the display 16, such as the temperature, pollutant content in the passenger compartment, or reports of traffic jams, etc. This multifunction display 16 is used according to the invention to set the sensitivity of the rain sensor 20, with the driver varying the above-described parameters.

In an alternative feature of the exemplary embodiment, instead of a central electronic control unit 10 with data communications lines arranged in a star for indirect triggering of the motor vehicle equipment and in particular the rain sensor 20, a different arrangement, such as a ring arrangement, is chosen; then the microcontroller of the rain sensor 20 is triggered directly, that is, without a detour by way of the central electronic control unit 10, by the driver by actuating the buttons 18. Using a car radio 14 or a multifunction display 16 with buttons 18 as the control element 14 is again provided here.

In each of the exemplary embodiments above, further apparatuses are also triggered by the driver via the display 16 and the buttons 18. Examples that can be mentioned are child locks for the rear doors, shifting points for the automatic transmission, the seat adjustment memory for various drivers, the programming of turn-on and turn-off times, and temperature of an additional heater, etc.

What is claimed is:

1. A device for controlling automatic operation of a windshield wiper in a motor vehicle, said control device comprising
   a central electronic control unit (10) including means for triggering wiping operations of the windshield wiper (13);
   a rain sensor (20) including means for detecting rain on the windshield and means for generating sensor signals (22) for the triggering of individual ones of the wiping operations, said rain sensor (20) being connected to said control unit (10) in order to furnish said sensor signals (22) to said control unit (10); and
   sensitivity control means (14) for adjusting rain sensor sensitivity of said rain sensor (20), said control means (14) including at least one display for observing said rain sensor sensitivity or parameters controlling said rain sensor sensitivity optically and buttons (18) operable to adjust said rain sensor sensitivity or at least one of said parameters controlling said rain sensor sensitivity.

2. The device as defined in claim 1, wherein said sensitivity control means (14) for adjusting said rain sensor sensitivity includes means for adjusting said parameters and said parameters include a gain factor for for amplifying said sensor signals and one or more thresholds for said sensor signals.

3. The device as defined in claim 1, further comprising a data bus of the motor vehicle and wherein said rain sensor (20) and said sensitivity control means are connected to said data bus.

4. The device as defined in claim 1, wherein said central electronic control unit (10) includes means for adjusting said rain sensor according to sensitivity control signals from said sensitivity control means (14).

5. The device as defined in claim 1, wherein said rain sensor (20) includes a microcontroller comprising means for generating said sensor signals (22) for triggering said wiping operations.

6. The device as defined in claim 1, wherein said at least one display (16) is a multifunction display (16) with said buttons (18).

7. The device as defined in claim 6, wherein said multifunction display (16) includes means for generating control signals for triggering other devices in said motor vehicle.

8. The device as defined in claim 1, further comprising a car radio and wherein said car radio comprises said sensitivity control means.

9. The device as defined in claim 8, wherein said car radio includes means for generating control signals for triggering other devices in said motor vehicle.

10. The device as defined in claim 8, wherein said car radio has a plurality of operating modes and one of said operating modes is a programming mode in which said rain sensor sensitivity is adjustable and said buttons (18) include a first button and a second button, and further comprising means for switching said car radio over into said programming mode.

11. The device as defined in claim 10, wherein said first button consists of a toggle switch and said second button consists of a push button.

12. The device as defined in claim 10 or 11, wherein said means for switching over said car radio over into said programming mode comprises said first button and said second button and said car radio is switched over into said programming mode when said first button and said second button are simultaneously actuated.

13. The device as defined in claim 10 or 11, wherein said first button comprises means for selecting predetermined options and said second button comprises means for confirming a selection made by means of said first button, and one of the predetermined options is selected by actuating said first button once or multiple times and is confirmed by pressing said second button once.

* * * * *